United States Patent [19]

Stanley et al.

[11] Patent Number: 5,262,932
[45] Date of Patent: Nov. 16, 1993

[54] POWER CONVERTER

[76] Inventors: David L. Stanley, 15 Mallee Crescent, Southport, Merseyside PR9 8NO, England; Michael J. Leisten, 68 Margrove Park, Boosbeck, Cleveland, England, TS12 3BY; Adrian K. Lefedjiev, 16 Ilford Rd., Hardwick, Stockton-on-Tees, England, TS19 8EA; Roumen D. Petkov; Stefan T. Hadjivassilev, both of 11 Dartmouth Hse. Marfleet Avenue, Middlesbrough, Cleveland, England, TS3 8EW

[21] Appl. No.: 845,186

[22] Filed: Mar. 3, 1992

[30] Foreign Application Priority Data

Mar. 4, 1991 [GB] United Kingdom ............... 9104482

[51] Int. Cl.$^5$ ............................................ H02M 3/335
[52] U.S. Cl. ......................................... 363/26; 363/56; 363/98; 363/132; 323/272
[58] Field of Search .......................... 363/17, 98, 56, 58, 363/41, 132, 26; 323/272

[56] References Cited

U.S. PATENT DOCUMENTS

| | | | |
|---|---|---|---|
| 3,660,749 | 5/1972 | Kadri . | |
| 4,245,289 | 1/1981 | Mineck et al. . | |
| 4,301,502 | 11/1981 | Jacquet . | |
| 4,366,522 | 12/1982 | Baker | 361/91 |
| 4,456,949 | 6/1984 | Incledon | 363/26 |
| 4,583,156 | 4/1986 | Forge | 363/17 |
| 4,679,130 | 7/1987 | Moscovici | 363/17 |
| 4,802,078 | 1/1989 | Hill | 363/56 |
| 4,885,671 | 12/1989 | Peil | 363/17 |
| 4,992,919 | 1/1991 | Lee et al. | 363/17 |

FOREIGN PATENT DOCUMENTS

| | | |
|---|---|---|
| 0140580 | 8/1985 | European Pat. Off. . |
| 0206160A | 12/1986 | European Pat. Off. . |
| 0433155 | 12/1990 | European Pat. Off. . |
| 1597729 | 11/1977 | United Kingdom . |

OTHER PUBLICATIONS

European Search Report dated Apr. 6, 1992.
Hexfet Databook—pp. A-20.
Data Sheets PD-6.011.

*Primary Examiner*—Steven L. Stephan
*Assistant Examiner*—Ben Davidson
*Attorney, Agent, or Firm*—Cumpston & Shaw

[57] ABSTRACT

In one embodiment, a solid state DC power supply includes an inverter (30) having two half-bridges (32, 34) in which are provided pairs of MOSFETS (Q5-Q12) used as switching elements. An output transformer (60) and a rectifier (85) are connected to output terminals (T60). A feedback path includes switching control means (40) separate primary and secondary drive means (10, 20) supplying drive pulses to the switching means (Q5-Q12) in the inverter (30). The secondary drive means (12, 13) amplifies the pulse output of the primary drive means (11) in order to improve the switching speed of the inverter (30). Current detection is provided by a transformer (70) connected to switching (40). The primary and secondary drive means receive pulses from a pulse width modulator (IC5) the output of which is isolated by transformers (TX1, TX2). In a modification, a power converter in the form of a DC power supply includes parallel MOSFET (M) and IGBT (I) switch pairs in each arm of a full wave bridge configuration. The IGBT (I) has lower conduction loss and higher switching loss than the MOSFET (M) so that, when appropriately timed driving pulses are applied, the IGBT (I) carries current in most of a conduction period and the MOSFET (M) switches off whilst a low voltage is maintained across the IGBT (I). This reduces conduction and switching losses to a minimum.

9 Claims, 14 Drawing Sheets

POWER CONVERTER

This invention relates to a power converter which may be used, for example, as a solid state DC power supply for use in heavy engineering or construction industries. It may also be used in motor control or inverters and in other applications where power is converted.

In the case of DC power supplies, a range of such supplies are already known for use in various heavy engineering or construction industries such as shipbuilding, power plants, or oil refineries and petrochemical plants. These power supplies generally comprise a 3 phase 415/110 V transformer with an earthed centre tap secondary winding. Such power supplies are substantial in construction, being housed, for example, in a strong welded steel framed cabinet mounted on wheels for ease of transportation. These power supplies range in output from 48 KVA up to 70 KVA, with a typical 48 KVA unit weighing up to 300 kg and forming a 1 meter cube approximately. Since these power supplies are primarily intended for use in the field for on-site operation, their size, weight and portability create a problem. A further problem is that safety requirements in the field require the use of safe low voltages of up to, say 80 V with respect to earth and not all conventional power supplies conform adequately with these requirements.

One typical on-site application of a power supply is where power needs to be supplied either (a) to a plurality of interconnected electrical elements, which are used in a specially designed configuration to carry out an annealing process for heat treating welded vessels, or (b) for welding purposes. In the former case, heating elements of a discrete size and electrical resistance are connected in a configuration which is designed to have an overall electrical resistance to match the output characteristics of the transformer in the power supply. This creates a problem where a match cannot easily be made and/or where time and effort needs to be expended in designing a suitable configuration. There is therefore a need for a power supply unit which has both constant voltage and/or constant current control for use under various conditions and that would therefore enable such heat treatment to be carried out with a wider selection of heating elements, e.g. of different sizes, and which are connected in different configurations, e.g. having up to an 80 V rating. Such a power supply would not only facilitate the design and assembly of the configuration, but it could more readily be used for welding purposes, particularly where automatic cross-over is made possible between the heating and welding modes.

Conventional power supplies also require power to be switched either by contactors or solid state switches. This requires the use of external switching devices and this is undesirable. Moreover, such switches are typically controlled by a voltage in the range of 100–250 V DC and it would be advantageous if a power supply were provided which could lend itself more readily to any known voltage normally used for such external control.

A further problem can arise with the switching speed of inverters. In the case of using a drive circuit to operate two half bridges, the load capacitance of MOSFETS used in the half-bridges limits the switching speed and hence the output current which is available from the inverter. Moreover, increasing the switching speed can lead to more noise, whereby the inverter does not comply with RFI regulations.

Solid state power supplies are known for use in other applications, but these supplies use a phase angle control technique to produce low rms voltages at high power levels from a mains voltage supply. Such supplies do not comply with RFI regulations. They are also unsafe, because the output voltage is not isolated from the mains. Moreover, such supplies exhibit high peak voltages, which can lead to transient effects and hence cause circuit damage.

In the case of inventors using MOSFETS in bridge configurations, conduction losses occur primarily due to the voltage drop across each MOSFET switch. These conduction losses cause heat to be dissipated, thereby leading to a need for adequate cooling and hence adding to the size, weight and cost of power converters employing such devices. One of the preferred embodiments of the invention provides increased inverter efficiency and hence enables the size of the cooling system, and the overall size, weight and cost of an inverter, to be minimised.

At least the preferred embodiment of the invention seeks to overcome these problems and the limitations of the prior art and to provide a solid state power supply which has the following advantages:

(a) Improved switching speed in an inverter stage. The main advantages of high switching speed are;

i) It allows operation at higher switching frequency without power losses.

ii) This in turn reduces the size and cost of power components within the power supply which must store energy, such as transformers, inductors, filter capacitors and DC blocking capacitors.

(b) Improved portability. For example, the preferred embodiment of the invention enables a 10 kw unit to be constructed which weighs approximately 15 kg. The nearest currently available power supply is rated at only 5 kw and weighs 25 kg units embodying the invention can be readily assembled, as modules, into a pack, e.g. in multiples of 10 kw, at a voltage of up to 80 V, and the total number of modules which may be assembled is limited only by the input power supply.

(c) Improved noise immunity. For example, the invention may be embodied in a unit which complies with international RFI regulations, including BS 800.

(d) Improved safety. For example, in the preferred embodiment of the invention, the output voltage is isolated from the primary input to the power supply and it complies with the requirements of BS 638 in providing a safe working voltage. The output voltage and load current are also monitored, by an isolated circuit, so that a current limit, which may be variable, is not exceeded and the power supply is thereby protected in the event of a short circuit, or an overload.

(e) Improved versatility. For example, both constant voltage and/or constant current control can be provided with automatic cross-over between voltage/current modes. This facilitates use of the power supply either for heating elements, or for welding. It also enables a wider range of elements and configurations to be used.

(f) No external switching devices are used, since switching is inherent in the design of the power supply embodying the invention, thus eliminating the need for external switches.

(g) Reduced heat dissipation leading to further size reduction.

In accordance with one aspect of the invention, a power converter comprise

An inverter including a bridge configuration having an input, an output, a plurality of arms, and respective switching means in its arms;
  each of said switching means comprising a parallel combination of first and second devices, said first device having a lower conduction loss than said second device and a higher switching loss than said second device;
  switching control means connected in a feedback in a feedback path from said output to said input for generating switching signals to control the operation of said switching means, said switching control means including means for monitoring current and voltage generated by the power converter and a pulse width modulator having inputs connected to said monitoring means, said pulse width modulator also having isolated outputs for providing said switching signals; said pulse width modulator being responsive to the monitoring means to generate switching signals for maintaining substantially constant the current or voltage available from the power converter; and
  drive means for each bridge arm including independent buffer stages and further including, for each parallel combination of said first and second devices, first and second isolated channels and a latch, said first channel transmitting information concerning a required switch time from said switching control means to said latch, said second channel transmitting information concerning the current state of the buffer stages back to the switching control means for comparison with the required switching state, said drive means providing independent drive signals, in response to respective switching signals, wherein differentiated gating wave forms are used which have very short positive and negative impulses, said impulses being separated and then applied to the latch which in turn operates the respective buffer states for independently driving said first and second devices at predetermined times to that (a) said first device carries most of the current in its bridge arm during a conduction period, (b) said second device is maintained on when said first device is switched off towards the end of the conduction period and (c) said second device is subsequently switched off, whereby most heat, due to conduction loss, is generated in said first device during the conduction period and most heat, due to switching loss, is generated in said second device while switching off.

Preferably, the first and second devices are respectively an IGBT and a MOSFET. In this case, a timing pulse generator, driven by the pulse width modulator and including delay means, provides respective switching signals for generating the independent drive signals.

Preferably, the drive means includes independent buffer stages and further includes, for each parallel combination of said first and second devices, first and second isolated channels and a latch, said first channel transmitting information concerning the required switching state from said switching control means to said latch, said second channel transmitting information concerning the current state of the buffer stages back to the switching control means for comparison with the required switching state. Preferably, differentiated gating waveform are used which have very short positive and negative impulses. These are separated and then applied to the latch which in turn operates the respective buffer stages for driving said first and second devices.

All of the latter drive means are preferably connected to a separate auxiliary switch mode power supply.

Preferred embodiments of the invention will now be described with reference to the accompanying schematic Drawings in which.

Figure 1:
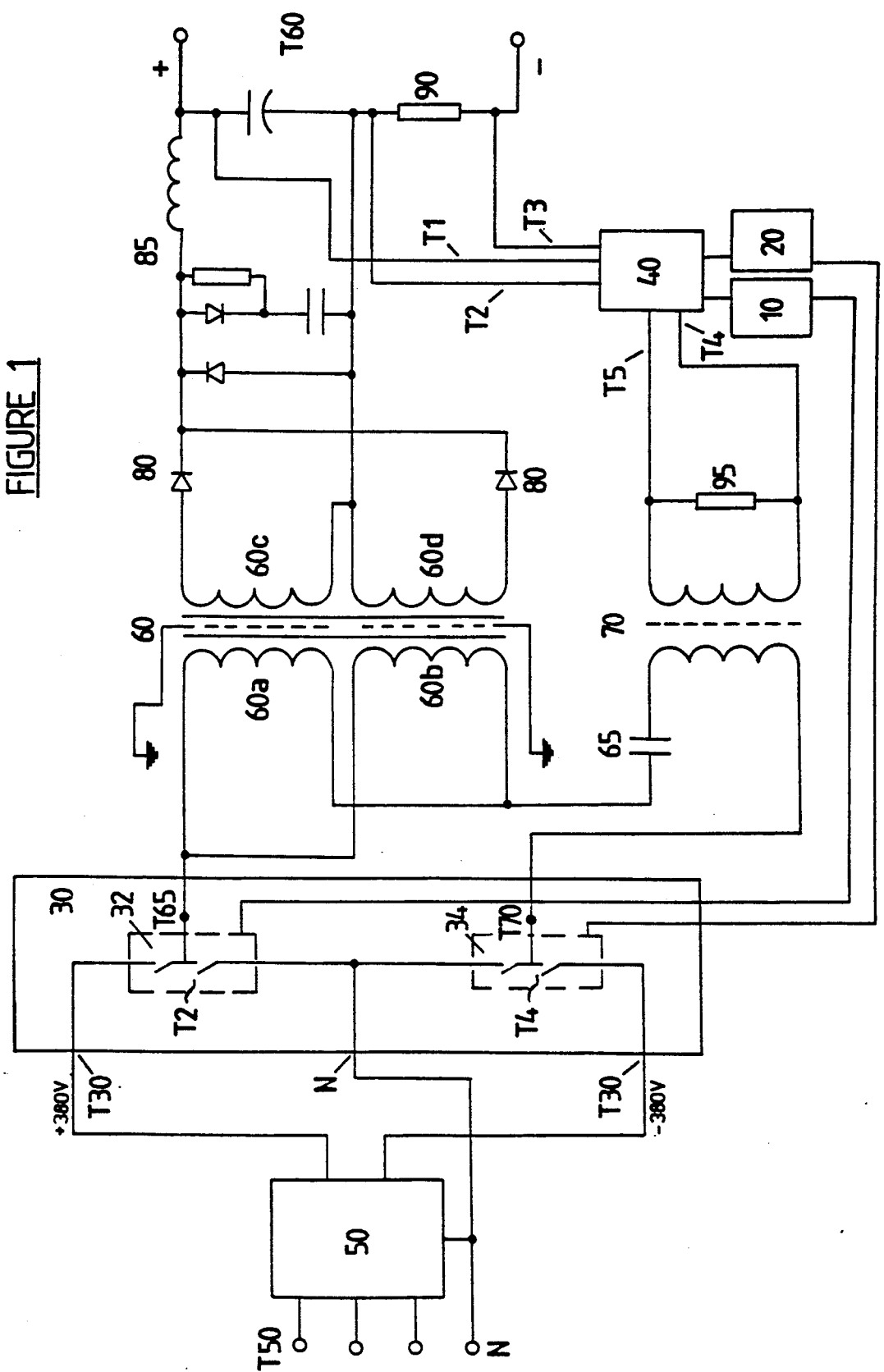
FIG. 1 is a block diagram of a DC power supply.

Referring to the Drawings, a brief description will first be given of the general circuit layout of the DC power supply shown in FIG. 1 and this will be followed by a more detailed description of the circuitry shown in FIGS. 2-4.

Referring to FIG. 1, a solid state DC power supply has input terminals T50 for connection, for example to a standard three-phase 415 V 50 Hz supply (not shown) including a neutral terminal N. Terminals T50 are connected to an uncontrolled diode rectifier 50 of known construction which provides +380 V and −380 V outputs across terminals T30 with respect to neutral N. An inverter 30 consists of two half-bridges 32, 34, containing switching means T2, T4 in the form of MOSFETS (Q5–Q12 described below), which half-bridges are connected in series to the +380 V and −380 V power supply. The lower arm of half-bridge 32 and the upper arm of half-bridge 34 are connected to neutral N. The inverter 30 is designed as a modified full bridge based on HEXFETS such as IRFP460. An output transformer 60 has primary windings 60a, 60b connected to the centre primary points T2, T4 of the half-bridges 32, 34. Primary winding 60b is connected to point T4 via a blocking capacitor 65 which blocks the DC components of the current output from the inverter 30 thereby preventing saturation in transformer 60. The secondary windings 60c, 60d are connected to diode rectifiers 80 for providing a DC supply to filter components 85, whereby terminals T60 provide a DC voltage of up to for example +65 V as the output. An output current shunt 90, connected in series with terminal T60, monitors output current drawn by the load and the monitoring signal is amplified and inverted by IC4 B (FIG. 2) contained in switching control means 40. This signal is used to drive a PWM converter IC5 (described below) for constant current mode operation. It is also compared with a fault level reference IC2 (VR2), described below, to shut down the power supply if output current becomes excessive. Similarly, a current transformer 70, has a resistor 95 connected across its secondary windings, to monitor transformer or inverter current. The monitoring signal is used to protect the inverter and is supplied to a comparator IC1 (FIG. 2) in the switching control means 40. If this monitoring signal exceeds a preset reference level (set by VR1 shown in FIG. 2), the power supply is shut down. Switching control means 40 has separate outputs connected to identical circuit boards 10, 20. Boards 10, 20 each contain primary and secondary drive means to provide drive pulses for the switching means in half-bridges 32, 34. It will noted that means 40, current transformer 70 and boards 10, 20 are connected in a feedback path to the half-bridges 32, 34 of the inverter 30.

Figure 2:
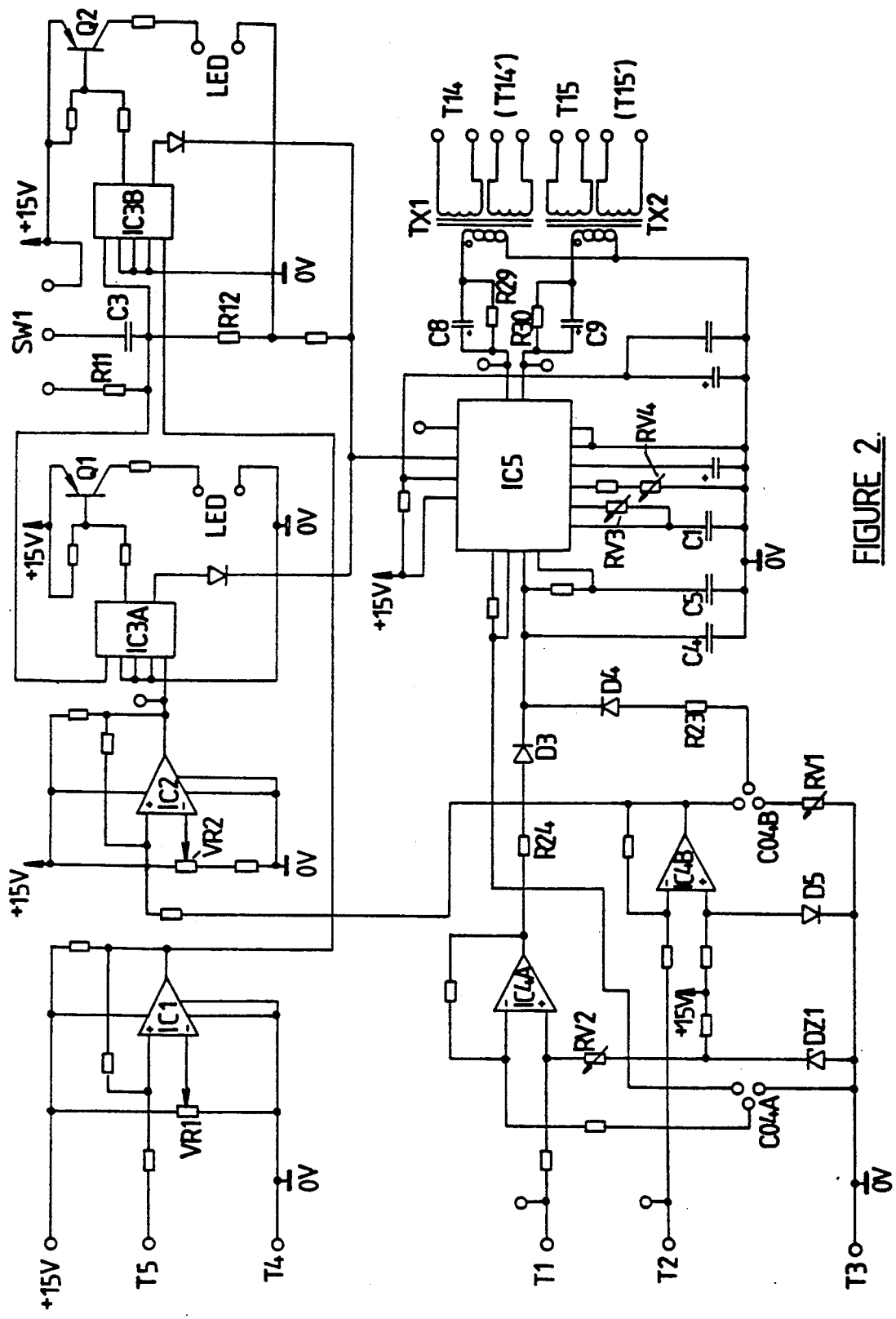
FIG. 2 illustrates, in more detail, switching control means (or a control and protection circuit) (40) used in the circuit of FIG. 1.

FIG. 2 shows section 40 of the power supply in more detail. This section generally includes input terminals T1-T5 for the current and voltage detection, a pulse width modulator IC5 and output terminals T14, T15 (T14', T15'), isolated by transformers TX1 and TX2, which supply the switching signals from the pulse width modulator IC5. This circuit will be described in more detail below.

Figure 3:
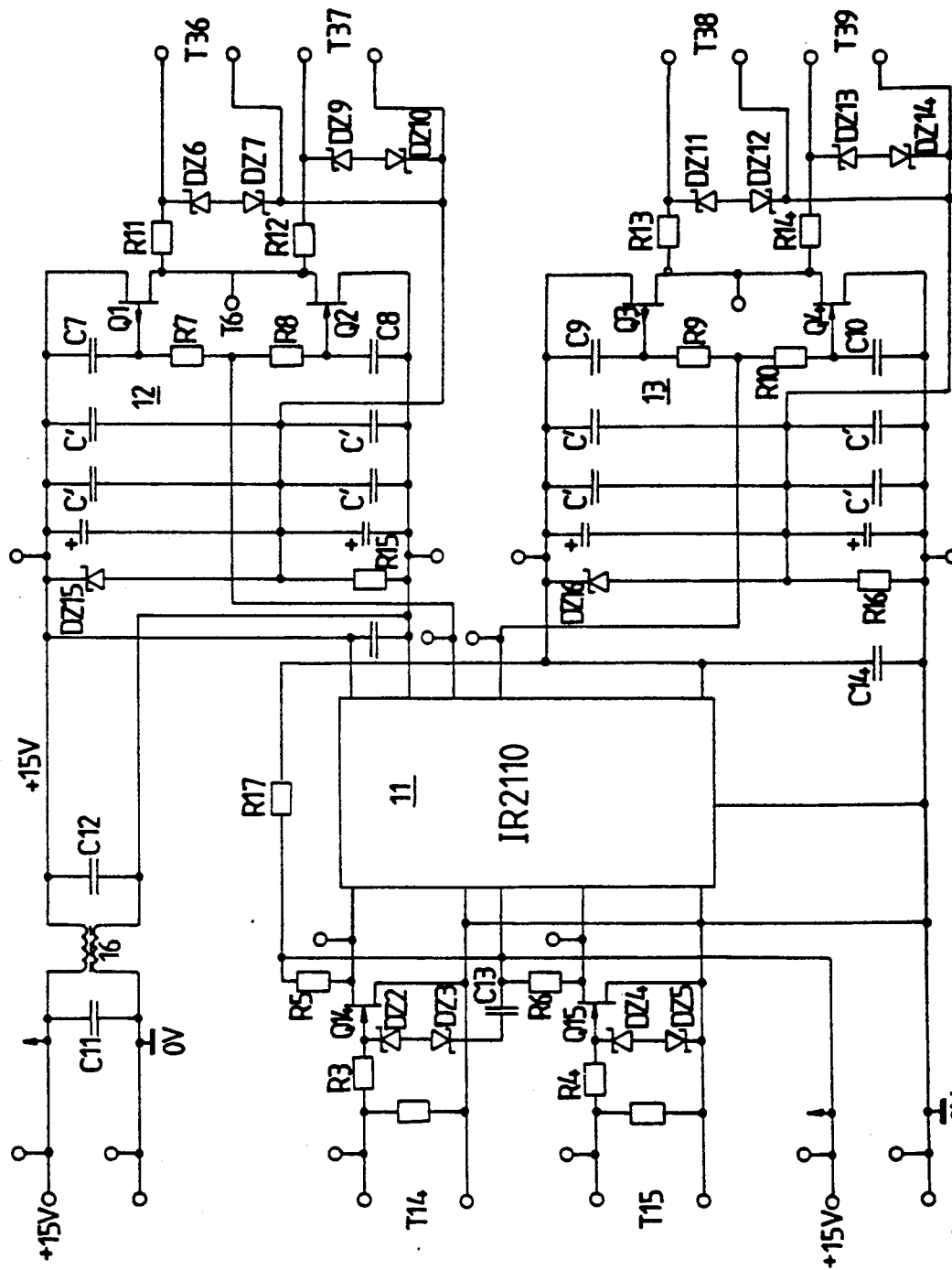
FIG. 3 shows, in more detail, components of primary and secondary drive means (20) used in the circuit of FIG. 1 for driving each half-bridge (32, 34).

FIG. 3 illustrates one of the boards 10, 20 in more detail and each board has similar circuitry. The switching signals are applied to terminals T14, T15 (and T14', T15' in the other board) which are connected to primary drive means 11 such as an IR 2110 high voltage bridge driver integrated circuit. The primary drive means 11 has respective outputs connected to each of two buffer stages 12, 13 which include respective matched pairs of MOSFETS Q1, Q2 and Q3, Q4. These buffer stages form the secondary drive means for providing drive pulses at output terminals T36-T39. The circuit of FIG. 3 will be described in more detail below.

Figure 4:
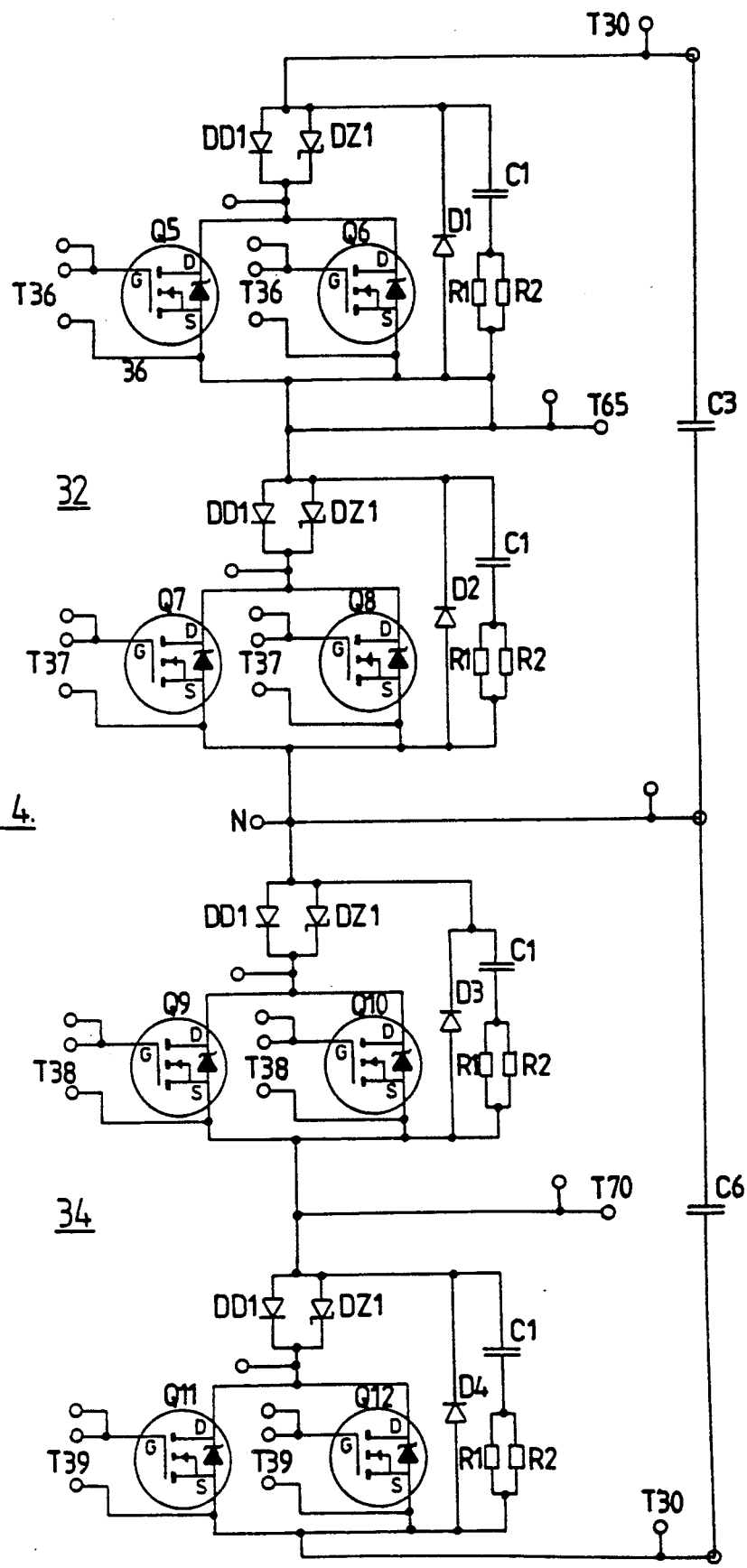
FIG. 4 shows, in more detail, the components of the half-bridges (32, 34) used in FIG. 1.

FIG. 4 illustrates the inverter 30 in more detail and shows the input terminals, for the drive pulses, T36-T39. These terminals are connected to respective pairs of MOSFETS Q5, Q6 and Q7, Q8 in half-bridge 32 and Q9, Q10 and Q11, Q12 in half-bridge 34. These MOSFETS are the switching means T2, T4 which are schematically represented in the inverter 30 shown in FIG. 1.

The inverter stage shown in FIG. 4 will now be described in more detail. Terminals T30 supply +380 V and −380 V to each of the half-bridges 32, 34 (see also FIG. 1). Two MOSFETS, e.g. Q5, Q6, are connected in parallel and used as switches in each of the inverter's arms. In order to prevent the MOSFETS from reverse conduction, a series Schottky diode DD1 is connected between each arm. A respective Zener diode DZ 1 protects each Schottky diode DD1 from excessive negative voltage and provides a DC path for the MOSFETS parasitic output capacitance which needs to be discharged. As the inverter load impedance is inductive, a respective free-wheeling diode D1, D2, D3, D4 is provided in parallel with each arm. Connected across each free-wheeling diode is (similar) "snubber" circuitry R1, R2, C1 which protects the respective MOSFETS and free-wheeling diodes against voltage spikes during reverse recovery of the free-wheeling diodes. The mains supply is protected against high frequency harmonics by connecting filter capacitors C3, C6 in parallel with the input of each half-bridge 32, 34.

The inverter 30 operates at 50 kHz constant frequency with pulse width modulation (PWM) power control derived from the circuitry shown in FIG. 3.

The inverter has output terminals T65, T70 connected to transformers 60, 70 as shown in FIG. 1.

Figure 5:
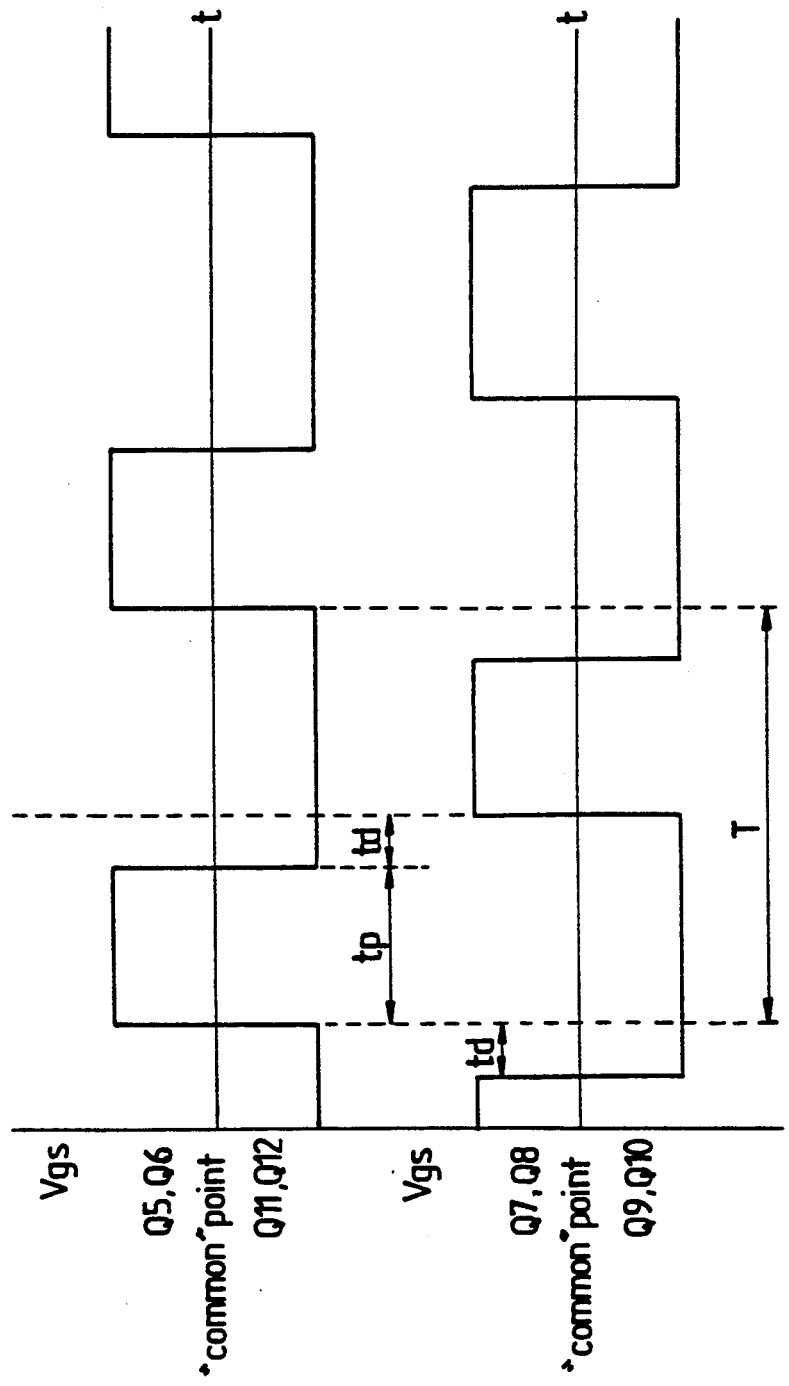
FIG. 5 is a diagram of idealised gate drive pulses for the switching means used in the half-bridges (32, 34).

FIG. 5 shows idealised gate drive pulses for the MOSFETS pairs Q5, Q6; Q7, Q8, . . . . As shown in FIGS. 4 and 5, MOSFETS Q5, Q6, Q11, Q12 are switched on and off at the same instant as represented by the upper pulse diagram. MOSFETS Q7, Q8, Q9 and Q10 are switched on and off at the same instant as shown in the lower pulse diagram. In each case, the drive pulses are applied to the gates of the MOSFETS. During a dead time "td", all of the MOSFETS are off and only the respective free-wheeling diodes D1, D4 (or D2, D3 respectively) conduct the inductive current for a period of time. Power is taken from the power supply only during the conducting time "tp" of either Q5, Q6, Q11, Q12. When Q7, Q8, Q9, Q10 conduct, current is drawn from the supply. The output voltage (power) is controlled by varying the duty cycle D of the control pulses in accordance with the relationship:

$$D = tp/T$$

where T is the period of the switching pulses shown in FIG. 5.

Turning now to FIG. 3, the primary and secondary drive circuits will now be described in more detail. Each of the channels or boards 10, 20 is identical with the circuit shown in FIG. 3. One channel supplies half-bridge 32 and the other supplies half-bridge 34. In each channel, anti-phase switching signals (derived from PWM 11), each having a duty cycle less than 50%, are applied to terminals T14, T15. These terminals are connected to identical input inverting buffer stages including MOSFETS Q14, Q15. Resistors R3, R4 determine the respective switching speed of MOSFETS Q14, Q15. Zener diodes DZ2, DZ3 and DZ4, D5 are connected in series, back to back, between the gate and source of the respective MOSFETS Q14, Q15 in order to protect them from excessive input voltage. Resistors R5, R6 are DC loads for MOSFETS Q14, Q15. The output of the two buffers are directly connected to the two inputs of the PWM 11 (IR 2110).

The PWM circuitry 11 provides two pulsed output drives with the necessary offset voltage required for driving the two half-bridges 32, 34, and these primary drives are further amplified by secondary buffer drive stages which include MOSFETS Q1, Q2 and Q3, Q4, to provide secondary pulsed output drives. The PWM circuitry 11 is included in an IR 2110 circuit which also provides some other functions like shut-down, low voltage control, etc.

The input load capacitance of the inverter MOSFETS Q5-Q12, normally reduces the switching speed of PWM circuitry such as the IR 2110. This capacitance prevents the IR 2110 from achieving a step wave form output. In other words, its theoretical step wave form deteriorates into a wave form having an unacceptably long rise time and fall time due to the MOSFETS input capacitance.

A solution to this problem was found by adding parallel discrete output buffer stages 12, 13, which act as secondary drive means, to amplify the drive pulse output from PWM 11 (IR 2110). Each stages 12 and 13 is driven directly from the IR 2110 and the IR 2110 acts as a switch to control the stages. Stages 12, 13 therefore buffer the IR 2110 output and improve its current capability without compromising the output of the MOSFETS Q5-Q12 in the inverter 30.

PWM signals are sent from the control board FIG. 2 (T14, T15) to the driven board FIG. 3. They are buffered by Q14 and Q15, and are then supplied to the IR2110 half bridge driver/isolator circuit 11. The IR2110 includes a "shut down" input to enable output pulses to be terminated, and "under voltage lock out circuitry" which ensures that no output pulses are transmitted to its outputs if either auxiliary power supply levels to the chip are not at the correct levels.

Apart from these two functions the IR2110 simply takes PWM signals from its two inputs and transmits them across isolation barriers to the two outputs.

Each stage 12, 13 includes matched pairs of MOSFETS Q1, Q2 (Q3, Q4) which have a very high off-resistance and a very low on-resistance. The low on-resistance provides a high current drive.

The result of using the buffer stages 12, 13 is that the MOSFETS Q5-Q12 are able to switch at near maximum speed. However, it is desirable to limit the speed of switching slightly so as to avoid radiation and harmonic problems since these can lead to waveform distortion and oscillations. Resistors R7, R8 and capacitors C7, C8 (likewise R9, R10 and C9, C10) are included in order to slow down slightly the switching speed of the FET'S Q1, Q2 (Q3, Q4) to avoid the danger of self-oscillation. They do not significantly affect the switching speed of Q5-Q12. The buffer stages 12, 13 thus both drive and condition the switching wave forms.

The buffer stages 12, 13 also ensure that the MOSFET gates Q5-Q12 are driven between $+7.5$ V and $-7.5$ V. These voltages prevent parasitic turn-on due to drain gate capacitance. This prevents residual source-gate capacitance, which carries a pulse to the gate, from the turning the respective MOSFETS back on, since any pulse carried in this manner would be result in a positive gate pulse and consequent switch on. Drive pulses are fed to the gates of each MOSFETS Q5-Q12, via separate gate resistors R11, R12 and R13, R14 which prevent parasitic oscillations between the parallel connected gates of MOSFETS Q5-Q12 is achieved. Over-voltage protection for the inputs of MOSFETS Q5-Q12 is obtained by using Zener diodes D26, DZ7; DZ9, DZ10; DZ11, DZ12; DZ13, DZ14 between the gate and source terminals T36-T39 connected to the respective MOSFETS Q5-Q12.

The supply voltages for each of the stages 12, 13 are separated. Stage 12 receives its supply from a separate $+15$ V auxiliary power supply (not shown) which is connected to an LC filter circuit including a specially made transformer 16 (used as a choke) and capacitors C11, C12. This filter prevents harmonics from flowing through the power supply. Stage 13 and the input buffer stages connected to T14, T15 are connected to the same auxiliary power supply (not shown) which is additional to the separate auxiliary supply of stage 12. Capacitors C13 and C14, together with resistor R17 are connected as close as possible to the pins of IR 2110 to act as low pass filters.

The amplitude of the positive drive pulses from each of the stages 12, 13 is stabilized to the Zener voltage of DZ15 and DZ16 respectively. Zeners DZ15 and DZ16 split the $+15$ V auxiliary supply into $+7.5$ V and $-7.5$ V to give bipolar output pulses.

Capacitors marked C' form local filters for improving the noise immunity of the stages 12, 13.

The main advantage of using the secondary drive means 12, 13 is low output impedance giving good dv/dt immunity and faster switching of MOSFETs Q5-Q12. The parasitic capacitance between stages 12, 13 is limited to that of the IR 2110.

Referring to FIG. 2, the switching control means 40 of FIG. 1 will now be described in more detail.

The pulse width modulator IC5 (which is a PWM controller SG3 525) has a timing capacitor C1 and a preset resistor RV4 for adjusting its operating frequency. The minimum dead time "td" (shown in FIG. 5) can be adjusted by a preset resistor RV3. IC5 produces two pulse outputs which are applied to the primaries of respective pulse transformers TX1 and TX2 which isolate IC 5 from the primary drive means (shown in FIG. 3). Resistors R29, R30 limit the maximum output current of IC5. Capacitors C8, C9 speed up the switching pulses. The pulse transformer TX1, TX2 has two secondary windings which are connected to terminals T14, T15 (T14', T15'). These terminals are connected respective inputs of the primary drive means, as explained above. The mark-space ratio of the switching pulses on terminals T14, T15 (T14', T15') is automatically and variably adjusted by IC5 in response to variation in voltage/current detection signals which are processed by comparator circuitry IC1, IC2, IC4. Thus, variations in the load resistance of the DC power supply automatically lead to the necessary compensation for stabilising its output voltage and/or output current. For example, if a user sets a particular voltage, then the current will be altered so as to maintain this preset voltage. Alternatively, a constant current is maintained by changing the voltage. Automatic cross-over can therefore be achieved when using the DC power supply either in a heating mode (where current is supplied to a network of heating elements), or in a welding mode. Therefore, there is no need to make any changes to the DC power supply, other than to adjust DC reference levels. These reference levels are applied by external sources which are connected to potentiometers (not shown) having terminals CO4A, CO4B. These external references may be any form of convenient power supply which is available on site, e.g. a small stabilised and rectified power supply or batteries (since current drain is low).

With regard to the current monitoring mentioned above, respective monitoring signals are applied across terminals T1, T2, T3 and terminals T4, T5. The signal on terminal T1 is supplied to the non-inverting input of error amplifier IC4A, its inverting input being connected to a terminal of the potentiometer (not shown) connected to CO4A. Adjustable resistor RV2 and Zener diode DZ1 control the output offset of amplifier IC4A. Since the reference voltage of amplifier IC4A is adjusted by the potentiometer connected to CO4A, this sets the output voltage of the converter.

The monitoring signal derived from register 90 is fed to terminal T2. This terminal is connected to the inverting input of error amplifier IC4B (FIG. 2). The operating point of this amplifier is pulled up to the beginning of the linear part of its transfer characteristic by applying 0.6-0.7 V reference voltage to its non-inverting input, i.e. the forward voltage drop of diode D5.

The output current of the power supply is adjusted by setting the value of a potentiometer connected to terminals CO4B. The output signal from amplifier IC4A and part of the signal from amplifier IC4B are applied, via two steering diodes D3, D4 and resistors R23, R24 to the inverting input of IC5 (i.e. to an error amplifier contained in the circuitry of SG 3525 A, which forms the basis of IC5) which amplifies the larger of the two voltages. Resistors R23 and R24 define the different gain of the error amplifier, within IC5 for the voltage and current signals. Frequency compensation is introduced by capacitors C4, C5.

Separate over-current protection is realised for the inverter and output rectifier as follows. Inverter current is measured by a ferrite cored current transformer 70 (FIG. 1) and the voltage drop across load resistor 95 is supplied to terminals T4, T5. This enables the voltage drop to be constantly monitored by an analog comparator (LM 311 N) which includes error amplifier stages IC1, IC2. The current limit for the output of IC1 can be adjusted by a preset resistor VR1. When the current limit is exceeded, the output voltage of comparator IC1 becomes high and this causes a latch IC3B (based on a CM 4027 circuit) to change state. Latch IC3B then sends an output signal to shut down the PWM control in IC5 whereby the generation of the control pulses stops simultaneously.

IC2, which acts a voltage comparator, constantly monitors the output signal from current feedback amplifier IC4B. If this operating signal becomes equal to a reference voltage, preset by VR2, then the output voltage of IC2 becomes high and a latch IC3A (based on the CM 4027) changes state. IC3A then sends an output signal to IC5 to shut down the PWM control by ceasing the generation of switching pulses.

Two bi-polar transistors Q1, Q2 drive two LEDs which are connected to indicate that the unit has shut down and whether it was the output rectifier, or the inverter current that caused the shut down. A switch (not shown) connected to terminals SW1 together with capacitor C3 and resistors R11, R12, is used for resetting the latches in the protection circuit.

It will be appreciated that the foregoing embodiment has been described by way of example only and that changes can be made without departing from the scope of the invention.

Whilst the above described DC power supply circuit operates with good efficiency, a description will now be given of an improvement which can be used in power converters generally, including DC power supplies, inverters, motor control circuits, etc.

The improved power converter operates with a full bridge having parallel connected IGBT and MOSFET devices. It consists of two half bridge circuits supplied in series from a common uncontrolled three phase bridge mains rectifier. Each arm of the inverter bridge consist of parallel connected IGBT and MOSFET devices which are gated independently at predetermined times in order to minimise overall power losses.

Figure 6:
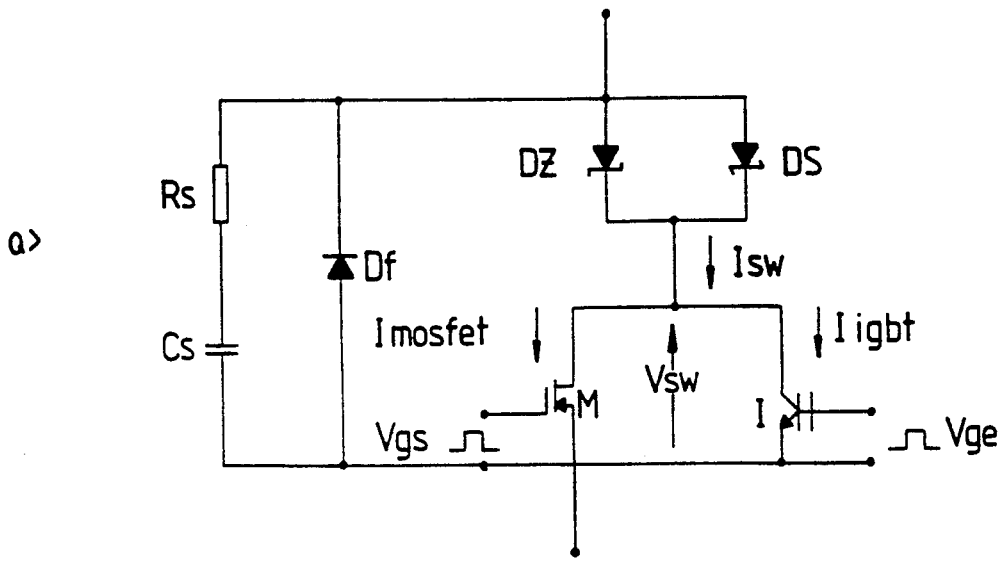
FIG. 6 is a schematic diagram of the switch arrangement used in each area of a modified bridge configuration for use in a DC power supply of a further embodiment.
Figure 9:
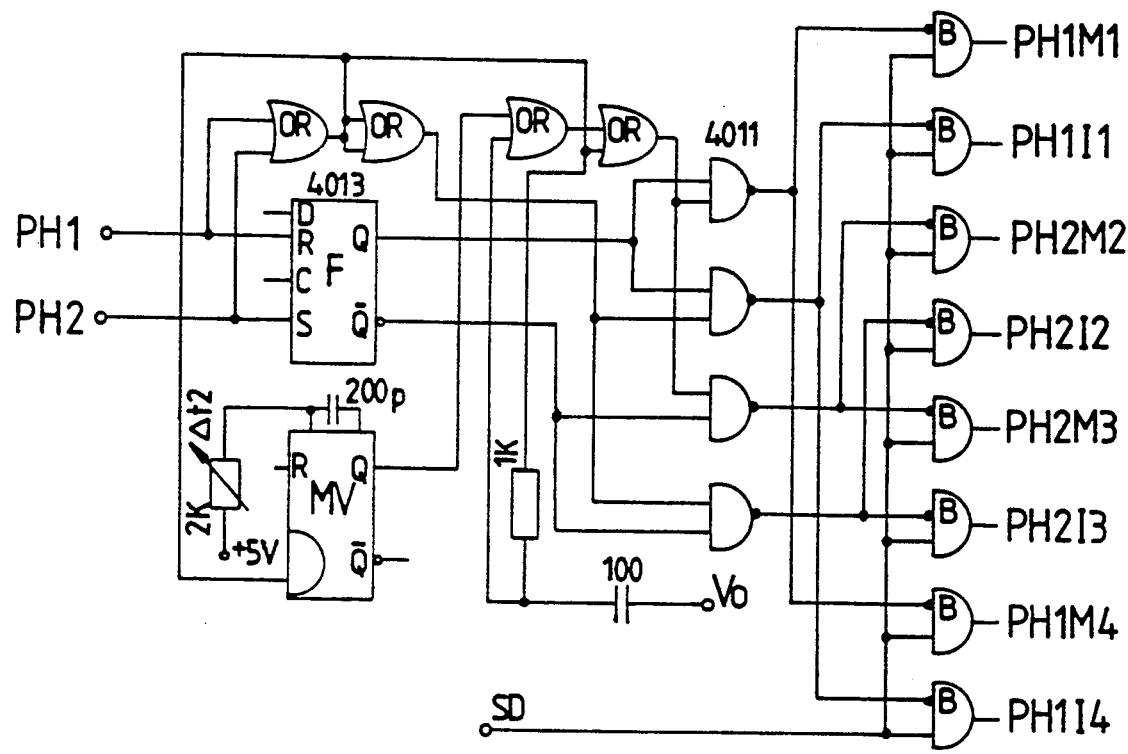
FIG. 9 is a timing circuit for use with the FIG. 6 embodiment.

Comparing the improvement broadly with the half bridge embodiment described above, the parallel MOSFETs of the half bridge circuit are replaced by parallel MOSFET/IGBT combinations as shown in FIG. 6 and a full bridge configuration is employed. All other components in the inverter power circuit generally remain unchanged. In order to cope with the parallel IGBT-/MOSFET combination switches, the following changes are necessary:

a) Double number of isolated drive circuits are required, since the parallel IGBT/MOSFET switches can no longer be driven by the same driver.

b) Timing generation circuitry is required, e.g. as shown in FIG. 9, to generate MOSFET and IGBT gate drive signals for correct parallel operation.

Figure 12:
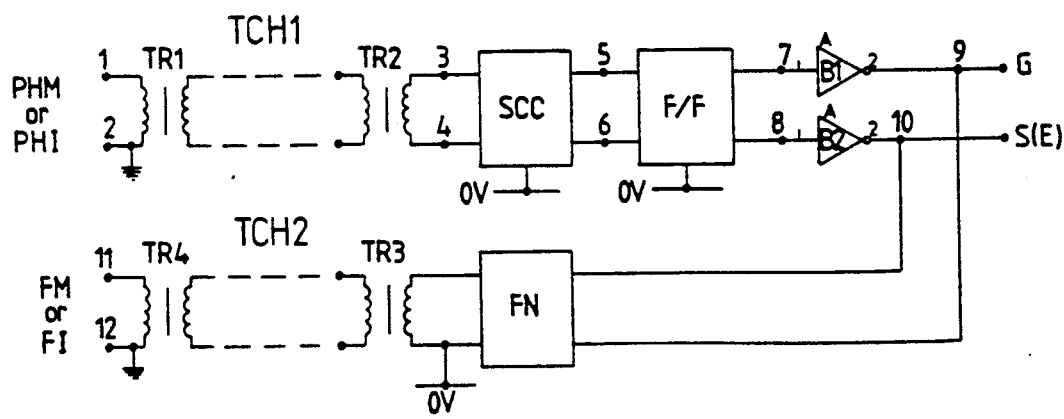
FIG. 12 is a schematic driver circuit for use with the FIG. 6 embodiment.

The double transformer isolated driver circuit shown in FIG. 12 is an improvement over the previous IR2110 driver circuit shown in FIG. 3, because it provides better immunity to dv/dt transients, greater reliability and is less sensitive to power circuit conditions. It is also cheaper.

With this new driver circuit all isolated drive channels are identical therefore two of the drive circuits of FIG. 12 replace each one of the circuits shown in FIG. 3. Therefore, eight FIG. 12 circuits are required for the complete (IGBT/MOSFET) inverter bridge, one for each switching device.

Figure 10:
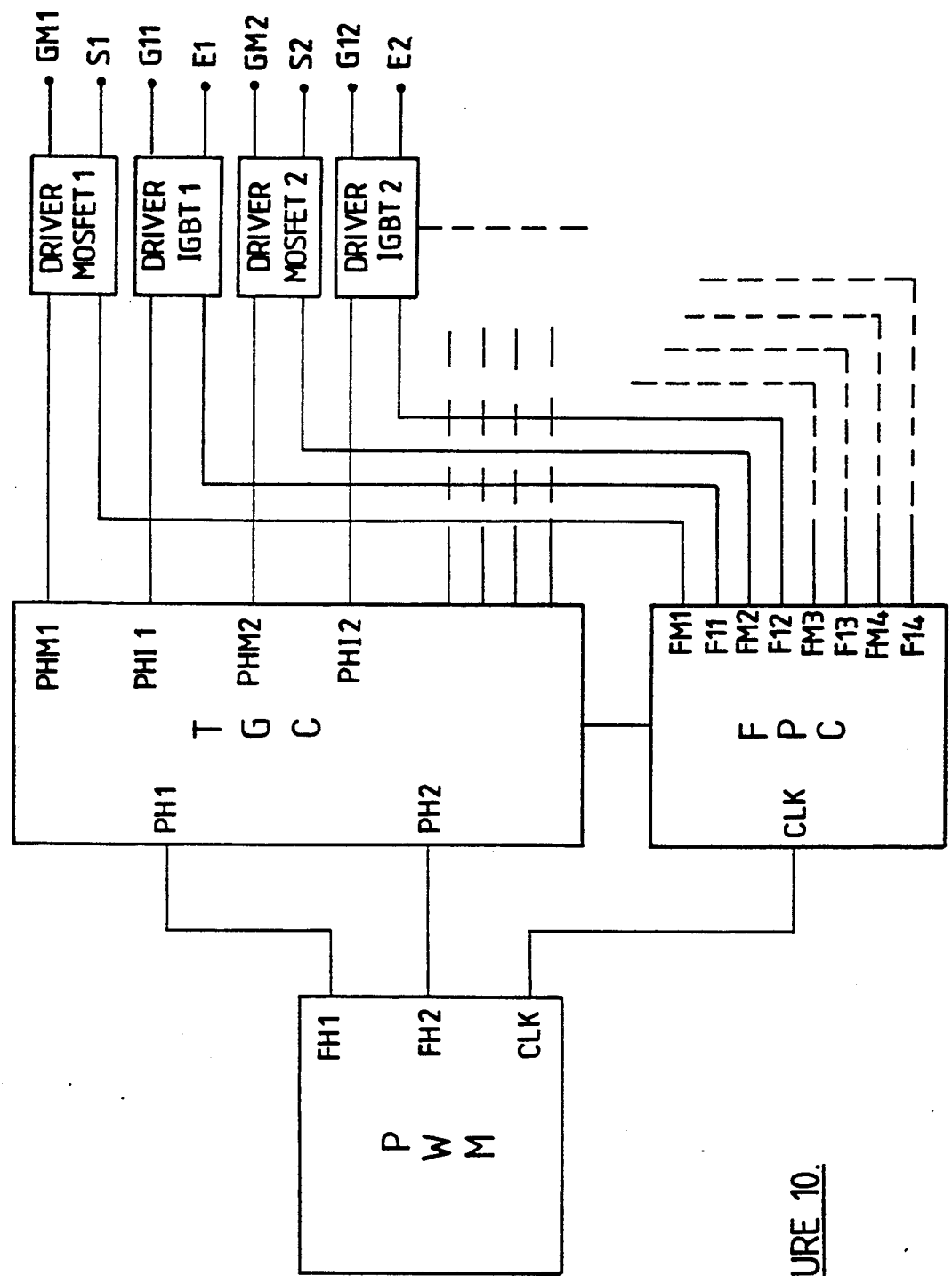
FIG. 10 is a special feedback protection circuit for use with the FIG. 6 embodiment.

A further improvement in circuit reliability and interference immunity is achieved by employing the feedback protection circuitry as shown in FIG. 10. If any error is detected in the transmission of drive signals via the isolated channels or output driven buffers, this system will stop generation of the inverter to prevent possibly disastrous cross conduction in the inverter, e.g. where both switches in one half-bridge are inadvertently switched on at the same time.

A high frequency switched mode auxiliary power supply circuit (FIG. 15), with multiple outputs is used to supply the eight isolated voltage levels required by the isolated driver channels (FIG. 12). This system replaces standard mains frequency "off-the-shelf" power supplies used in the earlier power supply (all MOSFET circuit). The HF switched mode auxiliary power supply circuit has the following advantages compared with its main frequency predecessor:

a) Greatly reduced size, weight and cost.

b) Very small isolating transformer dimensions leading to low interwinding capacitance. The result is almost negligible interference between voltage levels supplied to individual driver channels.

Figure 7:
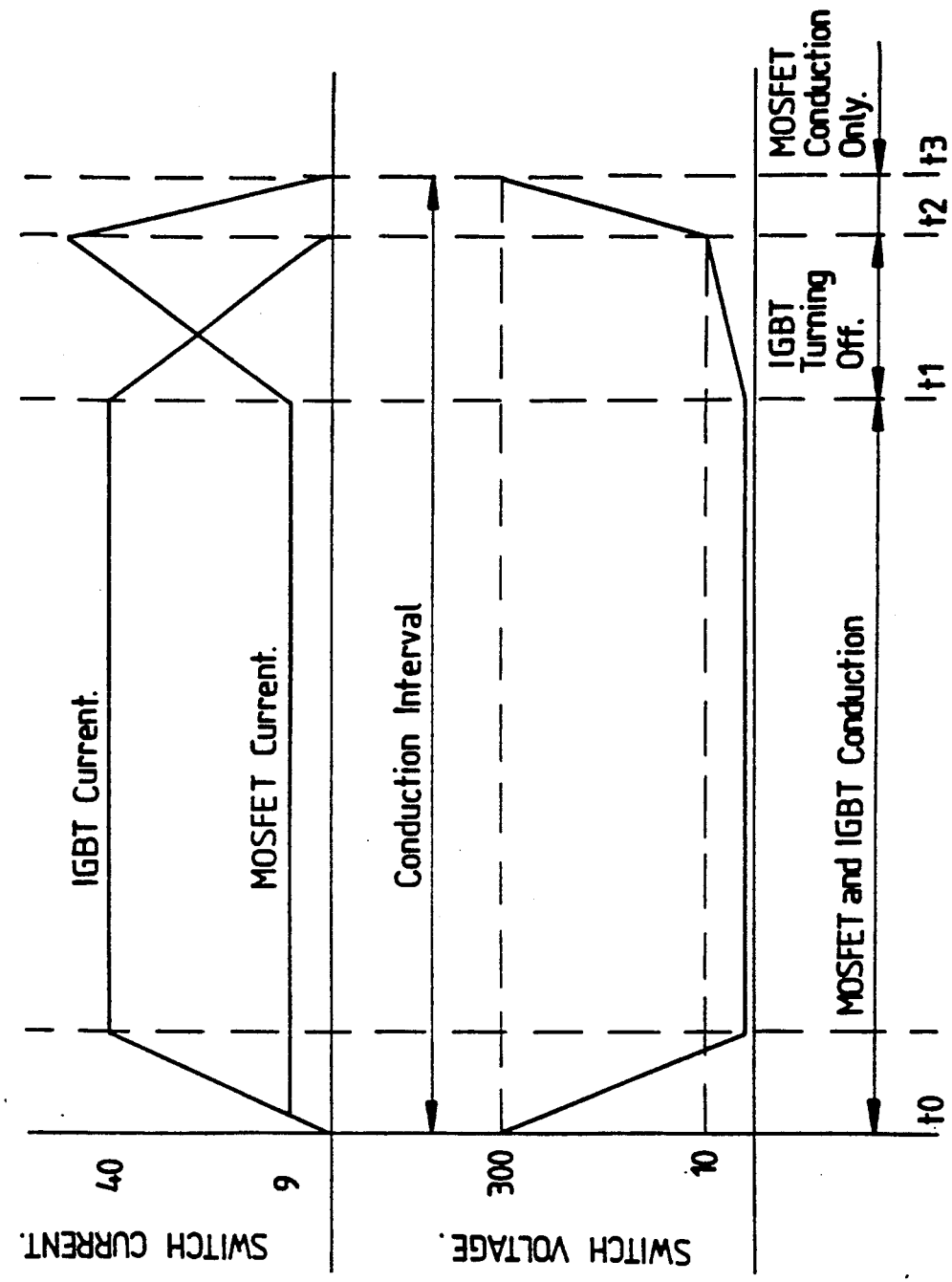
FIG. 7 is a timing diagram to explain the operation of the embodiment shown in FIG. 6.

A full circuit diagram of one inverter arm is shown in FIG. 6. A parallel combination of a MOSFET (M) and an IGBT (1) is used to form a current switch. The waveforms given in FIG. 7 illustrate its operation. The conduction interval of the switch is $t_0$-$t_3$. Both devices are turned on simultaneously to $t_0$ and remain on until $t_1$. Being a minority device, the IGBT exhibits much lower ON state voltage drop than the MOSFET, and effectively shunts it during this interval. Therefore between $t_0$ and $t_1$ the bulk of the switch current is conducted by the IGBT. At $t_1$ a turn off signal is applied to the gate of the IGBT, but the FET is still kept on. Between $t_1$ and $t_2$ IGBT turn off transient takes place. During this interval the entire the IGBT ceases to conduct and the MOSFET carries the whole switch current. At the same moment a turn off gate signal is applied to the MOSFET. Its turn off transient takes place between $t_2$ and $t_3$. At $t_3$ the MOSFET and the switch as a whole are fully off, which is the end of the conduction interval.

Figure 8:
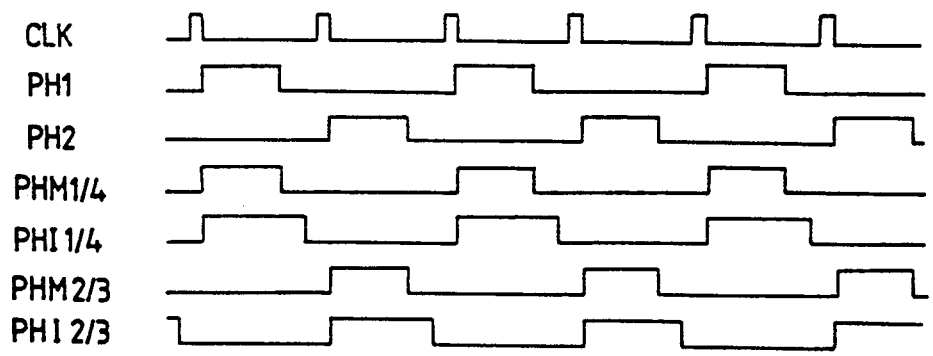
FIG. 8 is a diagram showing idealised gate drive pulses for the switching means used in the modified bridge configuration.

A timing circuit, shown in FIG. 9, is used to generate control pulses for the parallel IGBT/MOSFET switch operation. The timing generation circuit (TGC) is supplied with outputs (PH1 and PH2) from a standard PWM controller chip. It incorporates a delay to extend the MOSFET conduction period and allow the parallel IGBT time to switch off (FIGS. 8). This timing circuit which includes a double transformer isolated driver, a feedback protection circuit and a high frequency auxiliary power supply circuit (described below), can also be used as an improvement in the half bridge embodiment described with reference to FIG. 1.

One of the advantages of parallel switch operation is that conduction losses are minimised. Inverter conduction losses are primarily determined by the voltage drop across the switch (Vsw) during conduction. The IGBT, which carries the bulk of the switch current, provides a very low on stage voltage drop. As a result inverter conduction losses are greatly reduced.

A further advantage is that switching losses can be minimised. The predominant part of the switching losses in the inverter is normally generated in the IGBTs because of their low turn off speed. In the parallel switch configuration, an IGBT turn off transient takes place while the MOSFET is still on. This has two major effects on the IGBT switching performance. Firstly the IGBT turns off at very low collector-emitter voltage (the on state drain-source voltage of the conducting MOSFET). Secondly its switching speed is significantly increased due to the same fact. Both effects described above contribute to the improved IGBT dynamic performance and make its switching losses negligible. The good overall dynamic performance of the parallel combination switch is primarily determined by the properties of the MOSFET, which is a fast switching device.

These advantages lead to improved efficiency and reduced size, mass, and cost. Compared with an all MOSFET (or all IGBT solution), the parallel combination described above provides a substantial reduction in total inverter losses because the switching technique contributes to a substantial reduction in both device static and dynamic losses. This results in an improved inverter efficiency. As a direct result from the increased inverter efficiency the size of the cooling system, and the overall size, weight, and cost of the inverter can be minimised.

Preferably, the full bridge circuit described above includes a control system incorporating feedback protection circuit to eliminate incorrect switching. Referring to FIG. 10, a special feedback protection circuit (FPC) is incorporated in the control system. Signals (FM1, FM2, FM3, FM4, FI1, FI2, FI3 and FI4), carrying information about the current state of all switching devices, are fed back to this circuit at the end of each switching interval. If the feedback signals indicate a fault condition the unit is shut down immediately, otherwise the next switching cycle is allowed to proceed.

Figure 11:
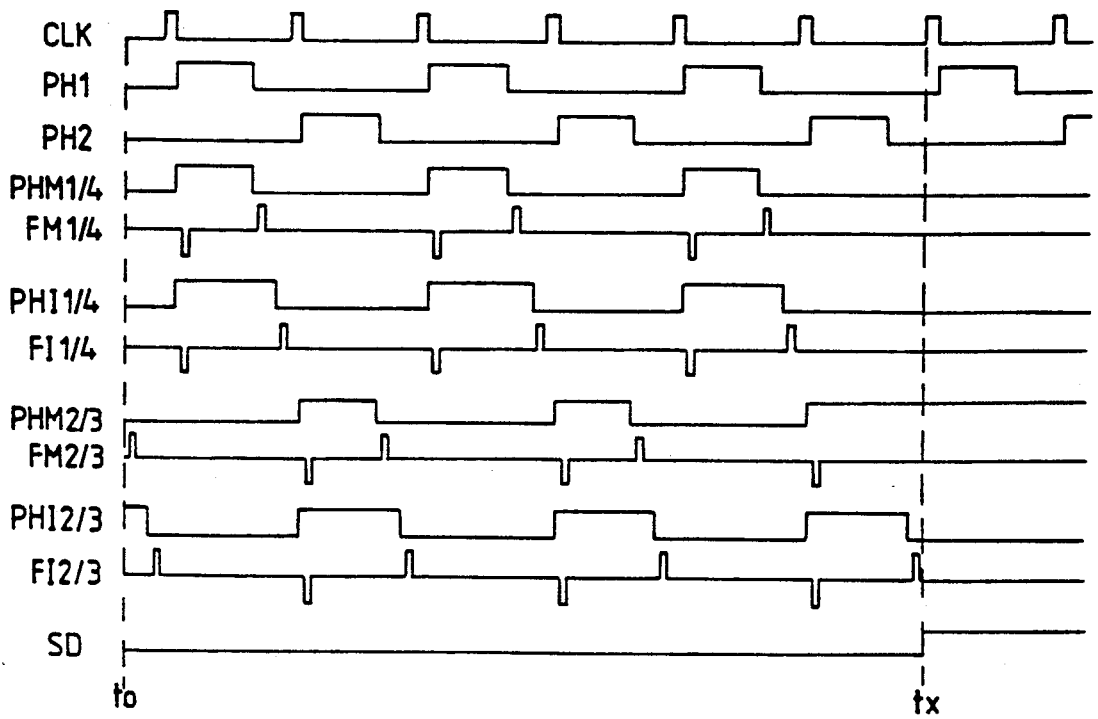
FIG. 11 is a timing diagram which illustrates operation of the special feedback protection circuit.

Waveforms illustrating the principle of operation of the control system are shown in FIG. 11. Each driver generates a negative impulse at the beginning, and a positive impulse at the end of the conduction interval of the driven power device. These pulse trains (FM.. and FI..) are supplied to the FPC together with the clock pulses from the PWM controller. (The feedback signals for devices of the same type working in phase will ideally look the same. For example, the pulse train designated by FI2/3 in FIG. 10 shows that the drivers DRIVER IGBT2 and DRIVER IGBT3 under normal working conditions will produce identical feedback signals FI2 and FI3.) If all positive feedback pulses have been applied to FPC before the leading edge of the PWM clock pulse (CLK), this is an indication that the last switching half cycle of the inverter has been successfully completed and the switching half cycle is initiated by the falling edge of the same clock pulse. If at instant tx and, for any reason, one of the switching devices (example MOSFET2 or MOSFET4) fails to switch off, its positive feedback pulse will be missing and a shut down signal (SD) will be generated by the rising edge of the next clock pulse (see FIG. 11). This signal is used to disable the timing generation circuit (TGC) and control pulses are no longer sent to the drivers. As a result the next switching cycle of the inverter will be blocked and all inverter arms will remain off. In this way potential cross conduction in the inverter is avoided.

This control system, incorporating a feedback protection circuit, eliminates the possibility for incorrect timing of the devices conduction period, which can result in detrimental cross conduction between the arms of the inverter. It greatly improves the interference immunity and prevents drastic failure of the power supply as a result of minor fault conditions.

Figure 13:
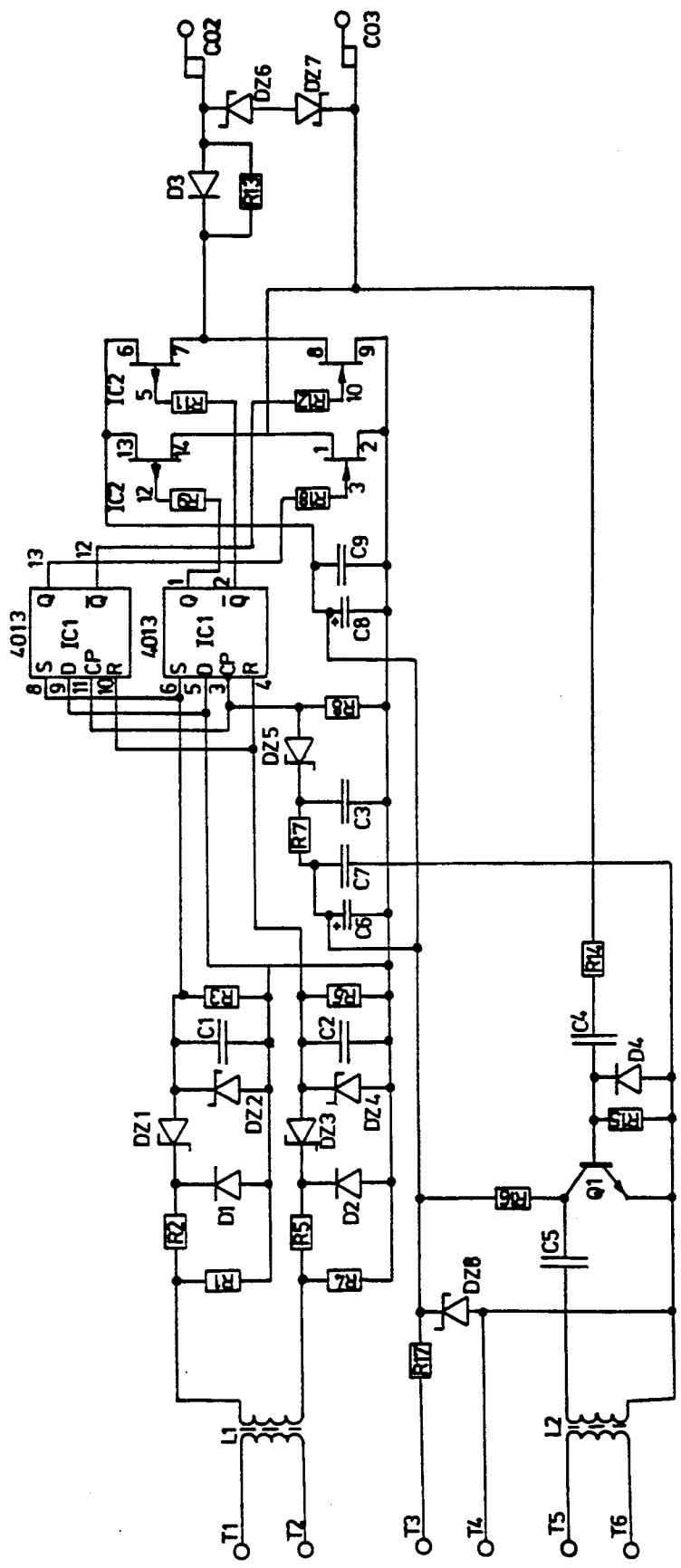
FIG. 13 shows a driver circuit board with a double isolated transformer.
Figure 14:
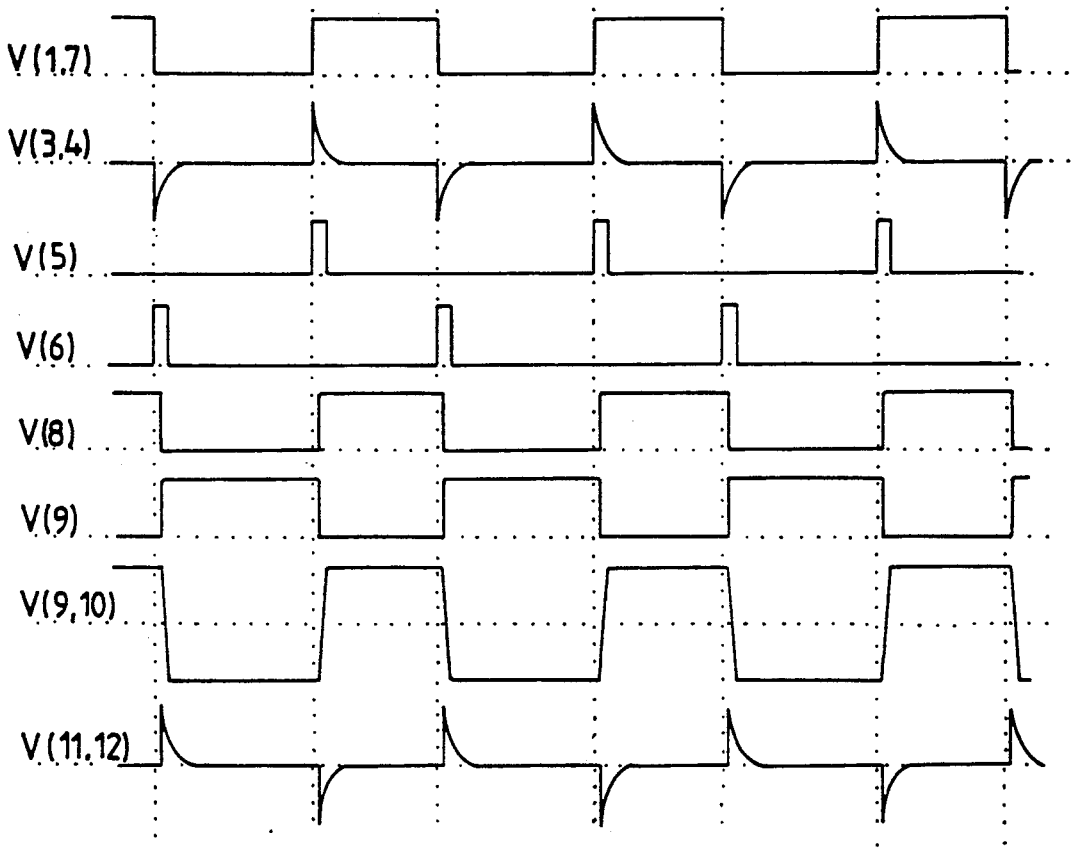
FIG. 14 shows driver circuit waveforms.

The full bridge embodiment of the invention has a modified driver circuit which is now described with reference to FIG. 12. Since both MOSFET and the IGBT have similar input impedance and drive requirements, the same type of driver is used for both devices. The driver circuit basically consists of two isolated transmission channels TCH1, TCH2, a latch F/F and two output buffers B1, B2, for driving the power device. One isolated channel TCH1 transmits information about the required switch state from the control board to the latch F/F. The second isolated channel TCH2 transmits information about the states of the output buffers B1, B2 back to the control system. The waveforms given in FIG. 13 illustrate the operating principle of the driver circuit. A rectangular gating waveform from the control system representing the required MOSFET or IGBT switch state is applied to the primary of the transformer TR1. It is differentiated by the saturating action of the transformer to produce very short positive and negative impulses which are transmitted via TR2 to the signal conditioning circuit (SCC). In the SCC positive and negative impulses are separated and applied to the latch F/F as flip-flop SET and RESET inputs. The required MOSFET or IGBT gating signal is therefore regenerated by the flip-flop F/F from the transmitted impulses. Inverted and non-inverted outputs of the flip-flop F/F control the low output impedance MOS buffers B1, B2, which drive the gate and source (emitter) of the switching power device.

The feedback transmission channel, consists of the feedback network FN and the two transformers TR3 and TR4. It is used to supply the feedback protection circuit in the control system with information about the current state of the driver output.

This circuitry provides increased dV/dT and noise immunity because only the edges (leading and falling) of the control pulses are transmitted between the control board and the driver. Therefore an isolation transformer with a low coupling coefficient can be used. This makes it possible to drastically reduce the number of primary and secondary turns and to use ferrite cores with a small cross-sectional area and physical dimensions. Such a design results in a negligible coupling capacitance between transformer primary and secondary and therefore dramatically increases circuit dV/dT immunity.

As an R-S controlled flip-flop F/F is used to drive the output buffers B1, B2, any interference is seen at its inputs as a common mode signal and will not change its state. This as well as the fact that the signal conditioning circuit has logic thresholds well above the logic levels of the flip-flop F/F increases further circuit noise immunity.

Preferably, a high frequency switched mode auxiliary power supply is used to power the drivers and provides effective isolation between drivers and the power circuit. The power circuit and the drivers are supplied from the same mains and interference generated by the power circuit into the mains can easily disturb the operation of the drivers. Additionally during the switching transients in the inverter a high common mode dV/dT is generated between the drivers. Therefore, in order to increase both circuit dV/dT and noise immunity it is essential to minimise the parasitic coupling capacitances between the mains and the drivers, and between the separate drivers. This is achieved by supplying all drivers from a special auxiliary switch mode power supply. Because of its high operating frequency it employs an isolation transformer with a very small number of turns and therefore reduced parasitic capacitances.

FIG. 13 illustrates an alternative driver circuit board for use with the double isolated transformer arrangement shown by FIG. 12. The construction and operation of this driver circuit board, and the general operation of the full bridge DC power supply will be apparent to those skilled in the art and from the foregoing description of the half bridge embodiment.

Figure 15:
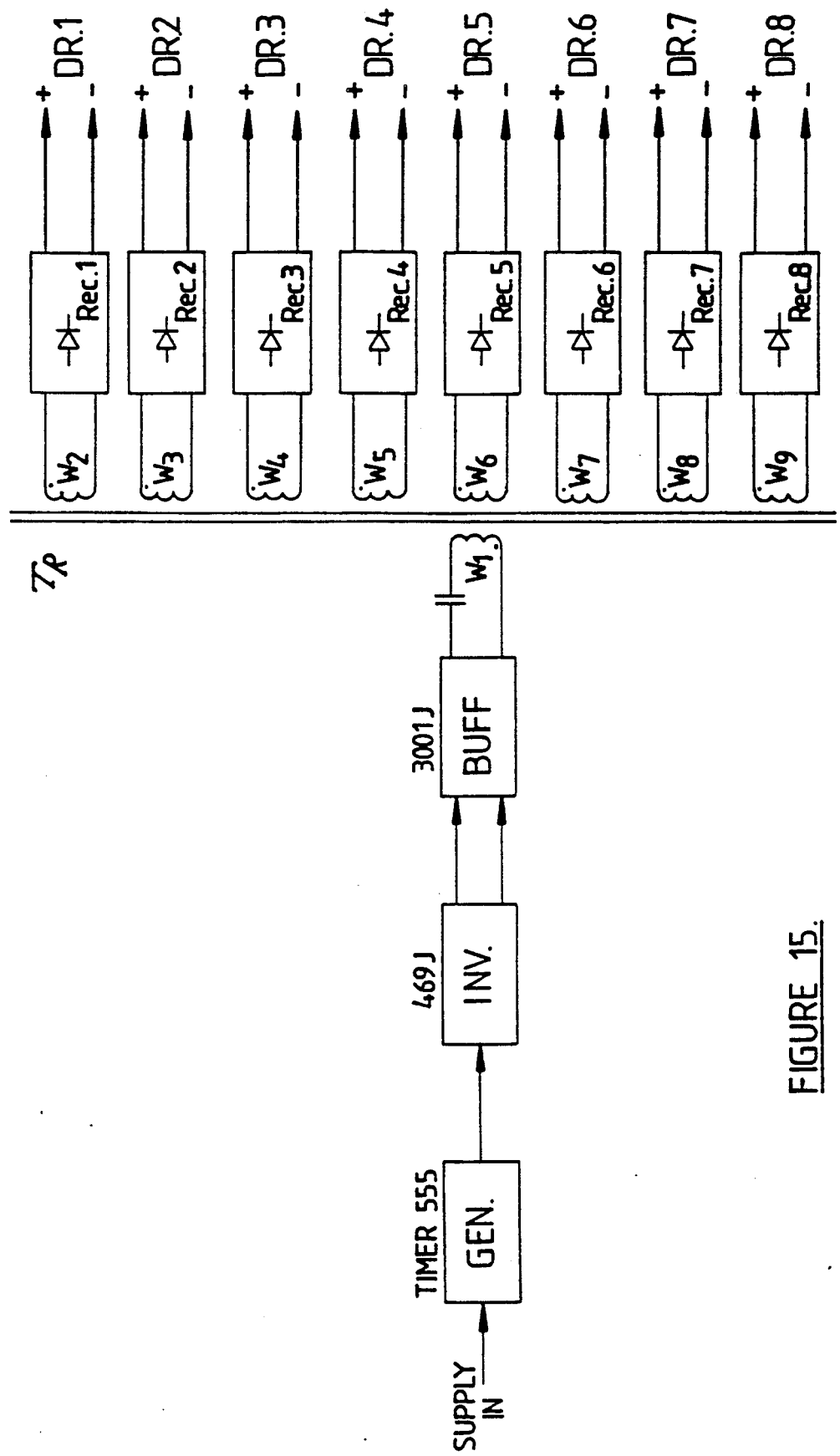
FIG. 15 is a block diagram of an auxiliary mode power supply.

A block diagram of the switched mode auxiliary power supply (SMAPS) is shown in FIG. 15. It consists of 555 oscillator (GEN) which produces a square wave signal at around 200 kHz. An inverter stage is used to buffer this signal and produce a second inverted version of the same waveform.

A buffer stage is used to amplify both the square wave signal and its inverse. The two signals are combined to produce a ±15 V bipolar signal which is applied to the primary winding of an isolating transformer via a DC blocking capacitor.

The isolating transformer has eight secondary windings W2–W9. Each secondary winding feeds an uncontrolled diode bridge rectifier with a capacitive filter to produce a smoothed 15 V DC voltage level.

Figure 16:
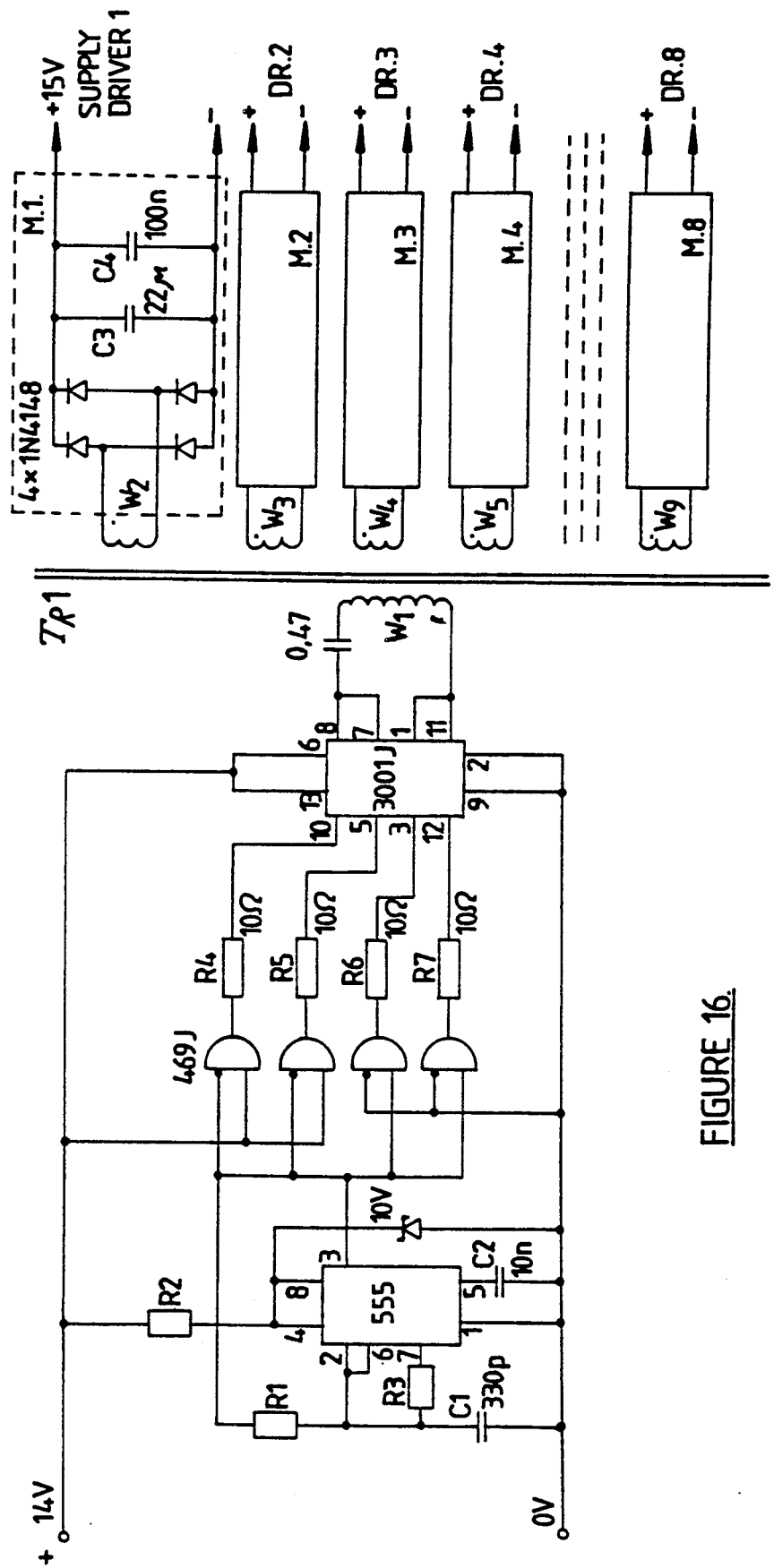
FIG. 16 shows a typical auxiliary power supply circuit.

A typical circuit diagram of this auxiliary power supply is given in FIG. 16.

We claim:

1. A power converter comprising:
   an inverter including a bridge configuration having an input, an output, a plurality of arms, and respective switching means in its arms;
   each of said switching means comprising a parallel combination of first and second devices, said first device having a lower conduction loss than said second device and a higher switching loss than said second device;
   switching control means connected in a feedback path from said output to said input for generating switching signals to control the operation of said switching means, said switching control means including means for monitoring current and voltage generated by the power converter and a pulse width modulator having inputs connected to said monitoring means, said pulse width modulator also having isolated outputs for providing said switching signals; said pulse width modulator being responsive to the monitoring means to generate switching signals for maintaining substantially constant the current or voltage available from the power converter; and
   drive means for each bridge arm including independent buffer stages and further including, for each parallel combination of said first and second devices, first and second isolated channels and a latch, said first channel transmitting information concerning a required switch time from said switching control means to said latch, said second channel transmitting information concerning the current state of the buffer stages back to the switching control means for comparison with the required switching state.
   said drive means providing independent drive signals, in response to respective switching signals, wherein differentiated gating wave forms are used which have very short positive and negative impulses, said impulses being separated and then applied to the latch which in turn operates the respective buffer states for independently driving said first and second devices at predetermined times to that (a) said first device carries most of the current in its bridge arm during a conduction period, (b) said second device is maintained on when said first device is switched off towards the end of the conduction period and (c) said second device is subsequently switched off, whereby most heat, due to conduction loss, is generated in said first device during the conduction period and most heat, due to switching loss, is generated in said second device while switching off.

2. A power converter according to claim 1, in which the said first and second devices are respectively an IGBT and a MOSFET.

3. A power converter according to claim 1, further comprising a timing pulse generator which is driven by said pulse width modulator and which includes delay means to provide respective switching signals for generating the independent drive signals.

4. A power converter according to claim 1 in which all the said drive means are connected to a separate auxiliary switch mode power supply.

5. A power converter comprising:
   input terminals for connection to a high voltage alternating supply;
   an inverter including rectification means providing a rectified DC supply, said rectification means being connected to said input terminals and including a pair of half-bridge circuits connected in series across the rectified DC supply, each half-bridge circuit having arms including parallel connected IGBT and MOSFET devices, said IGBT having a lower conduction loss than said MOSFET and a higher switching loss than said MOSFET;
   an output transformer/rectifier means connected between center points of said half-bridge circuits via a series capacitor, said output transformer/rectifier means having output terminals for providing a low voltage DC power supply;
   a feedback path connected between said output terminals and control terminals of said IGBT and MOS- FET devices, said feedback path including switching control means for generating switching signals for switching the IGBT and MOSFET in each respective arm ON together, and for switching said IGBT OFF before said MOSFET so that (a) said IGBT carries most of the current in its respective arm during a conduction period, (b) said MOSFET is maintained ON when said IGBT is switched OFF towards the end of said conduction period, and (c) said MOSFET is subsequently switched OFF; the arrangement being such that most heat, due to conduction loss, is generated in said IGBT during the conduction period and most heat, due to switching loss, is generated in said MOSFET while switching OFF, said switching control means further providing a dead time between the end of one conduction period and the start of the next conduction period for each of said arms; said switching control means comprising a timing pulse generator which is driven by said pulse width modulator and which includes delay means to provide respective switching signals for generating the independent drive signals for both said half-bridge circuits, so that (1) corresponding parallel connected IGBT and MOSFET devices, in opposite arms of each half-bridge circuit, are synchronously switched, and (ii) opposite arms are alternately switched, and further including means for monitoring current and voltage generated by the power converter and a pulse width modulator having inputs connected to said monitoring means, said pulse modulator also having isolated outputs for providing said switching signals; said pulse width modulator being responsive to the monitoring means to generate said switching signals whereby the current or voltage available from the power converter is maintained substantially constant.

6. A power converter according to claim 5 in which the drive means for each bridge arm includes independent buffer stages and further includes, for each parallel combination of said first and second devices, first and second isolated channels and a latch, said first channel transmitting information concerning a required switching state from said switching control means to said latch, said second channel transmitting information concerning the current state of the buffer stages back to the switching control means for comparison with the required switching state.

7. A power inverter according to claim 6 wherein differentiated gating waveforms are used which have very short positive and negative impulses, said impulses being separated and then applied to the latch which in turn operates the respective buffer states for driving said first and second devices.

8. A power converter according to claim 7 including a feedback protection circuit which receives information concerning the current state of all of said switching means, said information including a first pulse at the beginning of the conduction interval of the switching means, said feedback protection circuit also receiving a clock pulse from the pulse width modulator and being responsive to the presence of said first pulse to maintain said switching signals and being responsive to said clock pulse, in the absence of said first pulse, to suppress said switching signals.

9. A power converter according to claim 8 in which all the said drive means are connected to a separate auxiliary switch mode power supply.

* * * * *